United States Patent [19]

Wihksne

[11] 4,143,194
[45] Mar. 6, 1979

[54] DISPOSABLE FLOOR MAT COMBINATION

[75] Inventor: Allen Wihksne, Fort Worth, Tex.

[73] Assignee: Arbrook, Inc., Arlington, Tex.

[21] Appl. No.: 773,372

[22] Filed: Mar. 1, 1977

[51] Int. Cl.² .............................................. B32B 3/06
[52] U.S. Cl. ................................. 428/81; 15/104 A;
  15/215; 428/192; 428/45; 428/194
[58] Field of Search ............................ 428/45, 57–62,
  428/81–84, 192, 194; 15/112, 215, 216, 217, 236
  A, 238, 239, 104 A

[56] References Cited
U.S. PATENT DOCUMENTS

| | | | |
|---|---|---|---|
| 993,281 | 5/1911 | Todd | 52/537 |
| 3,083,393 | 4/1963 | Nappi | 15/215 |
| 3,435,480 | 4/1969 | Mann | 15/215 |
| 3,909,996 | 10/1975 | Ettlinger | 15/215 |
| 4,029,834 | 6/1977 | Bartlett | 428/62 |

Primary Examiner—Marion E. McCamish
Attorney, Agent, or Firm—Richard J. Rodrick

[57] ABSTRACT

A disposable combination of support and mat is used for removing loose dirt from objects coming in touch with the mat. The generally flat support has an area for a mat thereon with a pair of beveled surfaces astride opposed borders of the mat area. Additionally, along at least one edge of the support is means for interlocking the mat combination with similar combinations to provide a linked mat assembly.

13 Claims, 7 Drawing Figures

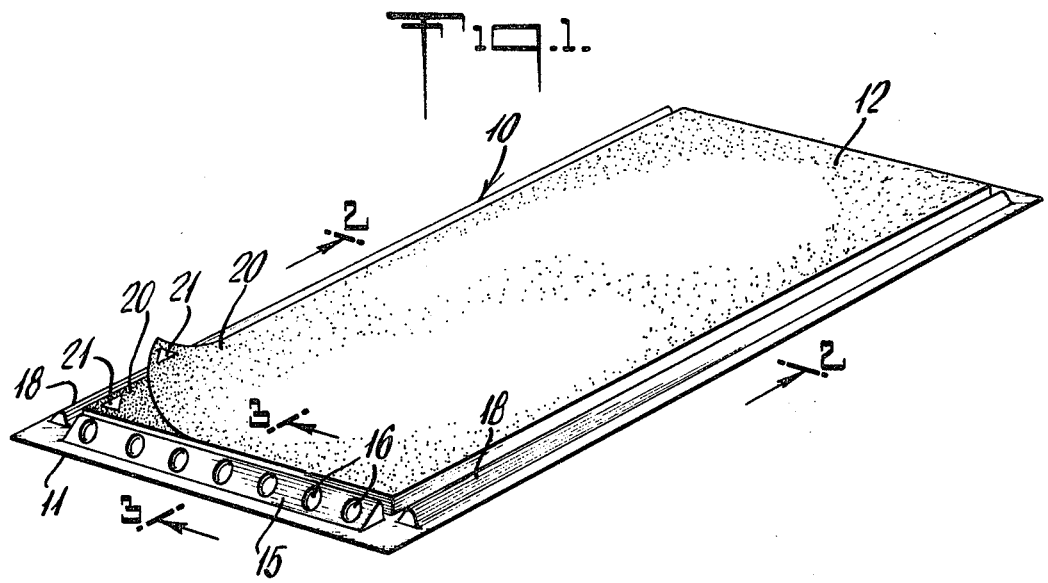
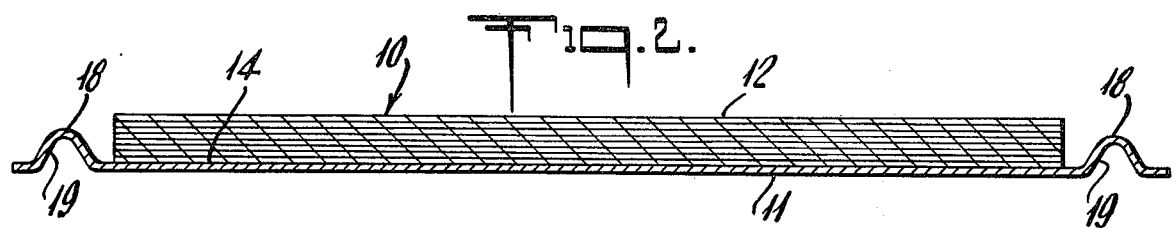
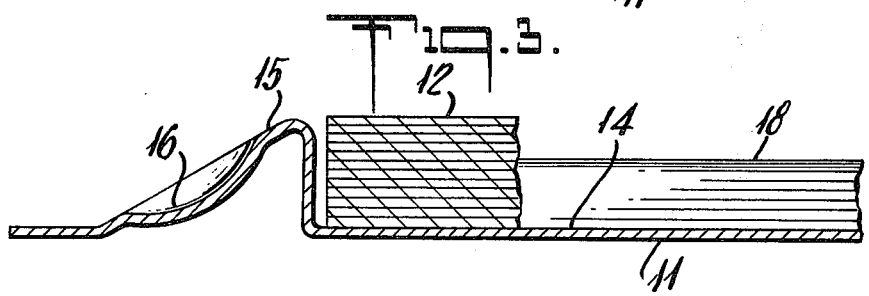
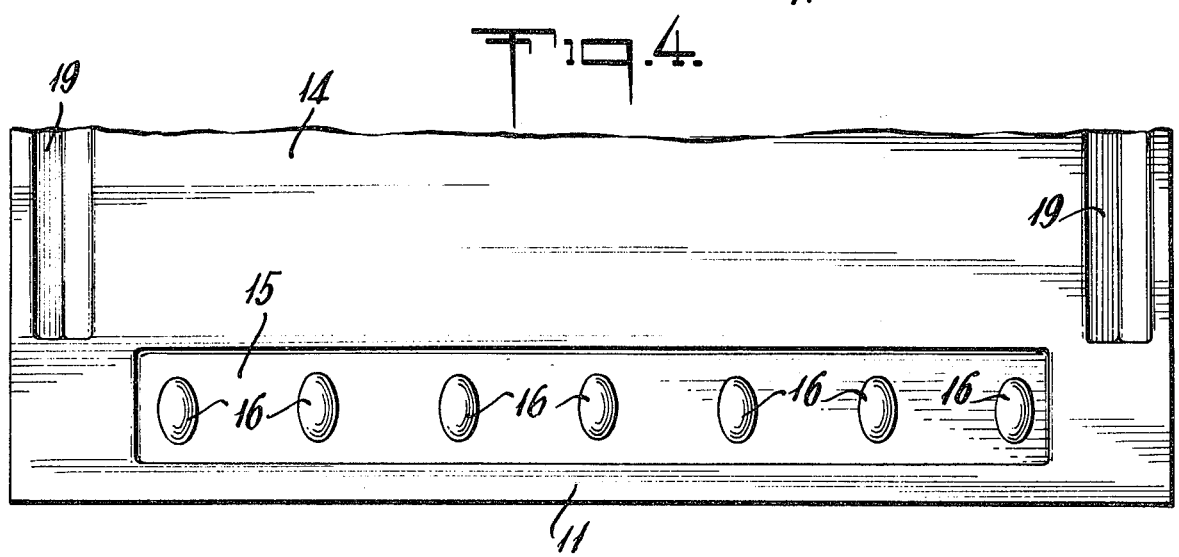

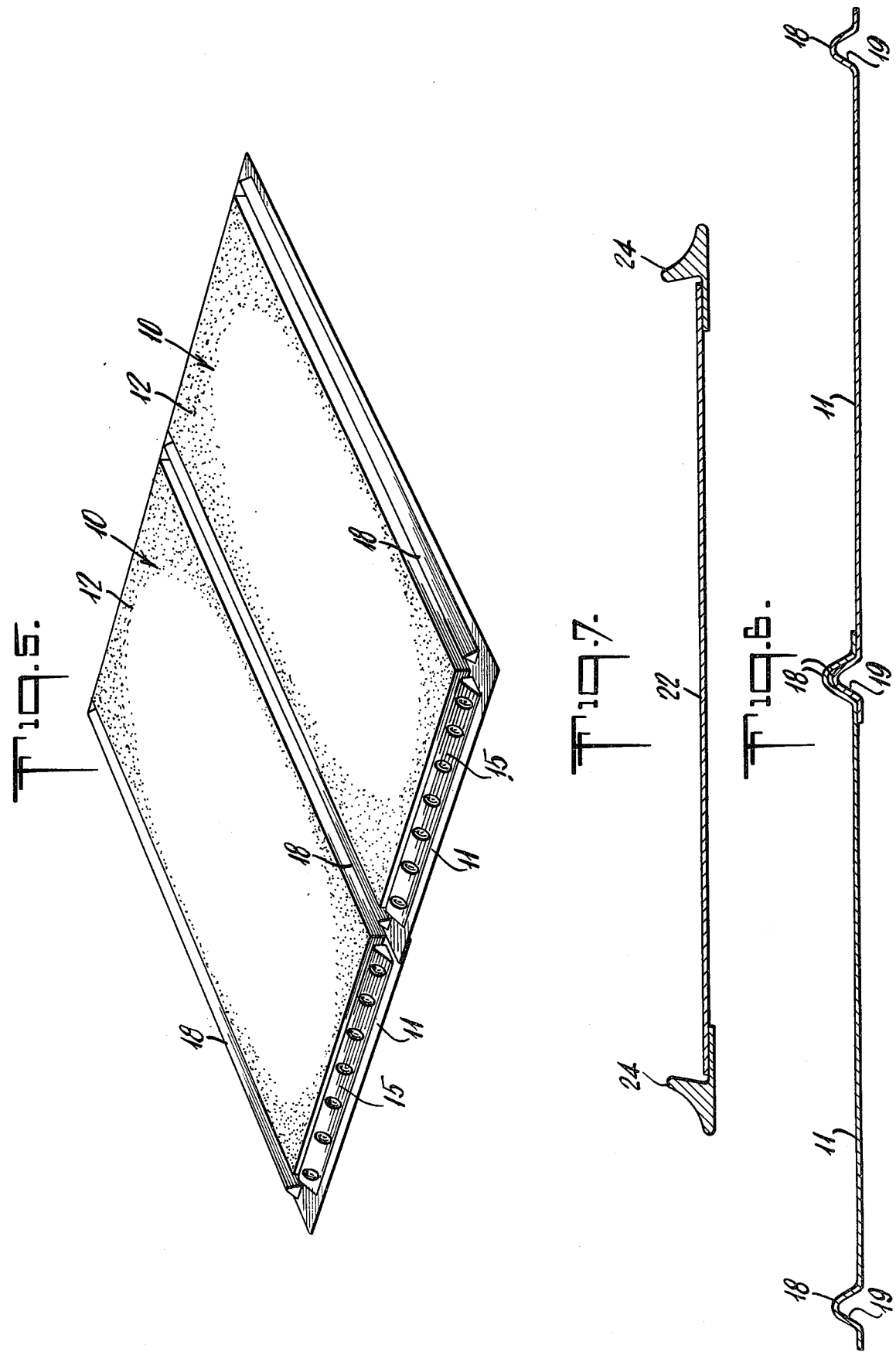

DISPOSABLE FLOOR MAT COMBINATION

BACKGROUND OF THE INVENTION

This invention relates generally to floor mats of the type wherein loose dirt and soil is removed from shoes and the like which contact the surface of the mat. More particularly, this invention concerns a disposable combination, preferably modular, of a mat for removing loose dirt from objects coming in touch therewith and a disposable support for such mat.

Floor mats with adhesive or tacky surfaces are commonly used in places where it is desirable to prevent loose dirt, particles, debris and the like from being spread about. Operating rooms of hospitals, laboratories, and industrial cleaning rooms are a few examples where dirt and loose particulate matter may cause contamination problems thus the need for attempts to collect such loose particles where possible even before the clean or uncontaminated area is entered.

Extensive carriers of loose particles of dirt, dust and the like are the soles of shoes and wheels of carts used for transporting patients or equipment into clean areas. It has been found that a floor mat with a tacky surface placed at the entrance of such a room or area, directly in the path of travel, is capable of removing substantial if not most of any loose particulate matter on shoe soles, wheels and the like. Besides serving as a collector of undesirable particulate matter, these type floor mats are also very convenient and practical; the floor mats can be made large enough so that a person walking across can step with each foot on the mat, without necessarily stopping, to allow the tacky surface to perform its function. Similarly, wheels or carts or rolling tables need merely to be rolled across a sufficiently large area so that the entire circumference of the wheel passes at least once over the adhesive mat. Especially in emergency situations, the adhesive floor mat concept allows quick passage thereover to collect loose, undesirable particles with no need to pause or stop to achieve these results.

Various types of adhesive floor mat arrangements are now available for use in hospitals or cleaning room applications. One prevalently used floor mat arrangement for collecting loose particles includes a frame support for holding a pad of stacked, peelable adhesive sheets, which act as the medium for removing dirt or dust from shoes and the like. This type of floor mat is disclosed in U.S. Pat. Nos. 3,083,393; 3,400,421; and 3,501,797. The support frame of the floor mat of these patents is secured to the floor at, before or just inside the entrance to the clean area. When the pad of adhesive sheets is depleted, the frame remains permanently affixed to the floor, and a new stack of sheets is inserted into the area bordered by the frame. While this type of arrangement has been successful and adapts well to meet the needs of the clean area, there are a number of problems or deficiencies which are inherent in this concept.

Being permanently or even semi-permanently mounted to the floor reduces the flexibility of use of the tacky floor mats. Specifically, the adhesive mat cannot be readily moved about if the travel patterns across the mat require a change, whether temporarily or on an occasional basis. To move the mat arrangement means that the entire permanently affixed frame has to be dislocated. In addition, for large areas of passage where the regular or normal size mat is not sufficiently large to afford adequate coverage, side by side arrangement is generally a convenient way to provide such coverage, however, with a permanent support frame for holding these pads it becomes cumbersome to have a series of frames affixed to the floor area. Furthermore, the permanently affixed frame often requires disassembling for purposes of cleaning any dirt or dust which accumulates under or around the frame. This, of course, adds additional maintenance expense for this type arrangement.

There are, in addition to the permanent frame mats as described above, floor mat arrangements that provide for the removal of loose dirt without the use of a frame. For instance, U.S. Pat. No. 3,785,102 discloses a throw away pad of tacky sheets for removing loose particles from shoe soles, wheels and the like for clean areas. The bottom most sheet of the pad is treated sufficiently to prevent the entire pad from moving about on the floor area; but yet, even the bottom most pad is eventually peelable from the floor surface. To achieve some of the functionality of the permanent frame type arrangement, the stack of sheets is beveled on all four sides. This beveling provides a slope or incline along the edges of the stack so that wheels of carts or tables can roll somewhat onto the tacky surface rather than having to bump over a more vertically straight surface. While this type of arrangement offers certain advantages over the framed mat assembly, some deficiencies exist in this concept also. For example, as the pad itself is beveled, the area of adhesive on the higher sheets in the stack have increasingly reduced adhesive area. Additionally, the beveling of the pad is an extra operation which not only adds expense but wastes material besides. As can be seen in both the permanently framed floor mat assembly and the unframed floor mat, there is room for improvement for this type of product.

SUMMARY OF THE INVENTION

To overcome the deficiencies noted in the previous floor mat the adhesive mat of the present invention is used in combination with a support, the combination of support and mat being disposable. Use of the disposable support for the mat or pad of mats allows the assembly to have desirable inclined surfaces thereon without any reduction in the adhesive mat area. In addition, use of the support with the mat of the present invention has a feature for locking and linking mat combinations together, adjacently, for greater coverage of the area to be protected. The support member of the present invention, being disposable, is also easily and inexpensively constructed of readily available materials. Furthermore, although the support of this invention is disposable, it includes a number of desirable features in its preferred form such as flexibility to provide more resiliency and pliability especially when patient carrying carts are rolled across; also, inclined or beveled surfaces can be formed in this flexible support in a reinforced manner to reduce the possiblity of such inclined surfaces being crushed by heavy objects repeatedly moving or rolling across the mat assembly.

In accordance with the principles of this invention, a disposable combination of support and mat removes loose dirt from objects coming in touch with the mat. This combination includes a generally flat support having an upper surface with an area defined thereon to accommodate the mat. On the upper surface of the mat is a pair of beveled surfaces, each beveled surface being astride opposed borders of the mat area and being inclined upwards towards the mat area. Along at least one edge of the support is means for interlocking the support with a separate but similar combination of support and mat to provide a flat, linked mat assembly. Secured to the mat area and proximate to the beveled surfaces is a mat having an upper surface with an adhesive layer thereon sufficient to retain loose particles of dirt coming in contact therewith.

In the preferred embodiment of the combination of support and mat, the mat is a pad of mats successively peelable from each other in descending order. Also, it is preferable that the support be formed of a one-piece thermoformed plastic material in a modular construction.

Another embodiment of the present invention pertains to the disposable support itself for carrying a mat or a pad of mats thereon. This support for the mats preferably includes reinforced inclined or beveled surfaces thereon and also locking means along at least one edge thereof for interlocking the support with similar supports for a linked assembly.

BRIEF DESCRIPTION OF THE DRAWINGS

These and other advantages, features and aspects of the invention will become apparent upon reading the following detailed description and upon reference to the accompanying drawings, in which:

FIG. 1 is a perspective view of the support and mat assembly combination;

FIG. 2 is a sectional view along lines 2—2 of FIG. 1;

FIG. 3 is a sectional view along lines 3—3 of FIG. 1;

FIG. 4 is a plan view of the bottom surface of the bevel;

FIG. 5 is a perspective view of a linked mat assembly;

FIG. 6 is an end view schematically illustrating the linked mat assembly; and

FIG. 7 is a sectional view illustrating an alternate edge construction along the long edge of the support.

While the invention will be described in connection with a preferred embodiment, it is understood that it is not intended to limit the invention to that embodiment. On the contrary, it is intended to cover all alternatives, modifications and equivalents as may be included within the scope and spirit of the described invention.

DETAILED DESCRIPTION OF AN EXEMPLARY EMBODIMENT

Adverting to the drawings wherein the preferred embodiment of the present invention is illustrated, particularly FIGS. 1-4, there is shown a disposable combination 10 of support 11 and mat 12 for removing loose dirt from objects coming in touch with the mat 12. It can be seen that support 11 is generally flat and assumes a rectangular shape in most embodiments of this invention. On the upper surface of support 11 is an area 14 defined to accommodate a mat; this area 14 is generally centrally located on the upper surface of the support 11 and desirably occupies most of the area on the support except for the edges along the ends and sides thereof.

Along the ends of the rectangularly shaped support 11 and astride opposed borders of the mat area 14, is a pair of beveled surfaces 15 which gently rise on the upper surface of the support 11. It can be seen, especially in FIG. 3, that beveled surface 15 is inclined upwards towards said mat area 14; on the opposed end of the support, not shown in the drawings, the upper beveled surface is also inclined upwards towards the mat area 14. It is the purpose of these beveled surfaces to allow wheels, for example, of rolling equipment to smoothly roll up and upon the mat 12 with minimal impact and shock. After passing over the mat 12 the wheels of the rolling equipment smoothly roll off the mat down the beveled surface 15 on the other end of the support 11. Inasmuch as the entire combination of support and mat is disposable and the support material is inexpensively produced, as hereinafter discussed, it is necessary in some applications to reinforce the beveled surfaces 15 to stiffen and strengthen the same to accommodate the weight of the equipment rolling thereover.

Referring particularly to FIGS. 1, 3 and 4 the beveled surface 15 has been formed with a plurality of indentations or dimples 16 spaced at intervals along the beveled surface. The indentations 16 may take a variety of shapes, but for practical purposes and ease of fabrication are circularly or elliptically shaped. These indentations 16 serve to prevent the beveled surface 15 from being crushed or deformed especially since the mats can expect repeatedly heavy use. Depending upon the amount of reinforcement desired, the number and size of the indentations may vary.

Along each of the side edges of the support 11, extending substantially the entire length thereof, is an embossed ridge 18 upstanding from the upper surface of the support. Due to the upstanding nature of the embossed ridge 18 from the upper surface of the support, it can be seen that a relieved or depressed groove 19 is formed in the bottom surface of the support corresponding with each of the ridges 18. Such a ridge/groove configuration along the side edge of the support allows for ready interlocking with other combinations of support and mat of similar construction to provide a flat, linked assembly. FIGS. 5 and 6 illustrate the interlocking function of the ridges and grooves. In those figures a plurality of combinations 10 of support and mats are shown linked together along the side edges thereof. Linking is accomplished merely by mating and overlapping the groove 19 on the edge of one support 11 with the ridge 18 of the other support 11. By linking adjacent mat assemblies together the coverage of the floor area on which the mats lie can be greatly increased without undesirable separation of the mats. Although the embodiment presently under discussion illustrates embossed ridges on each side edge of the support there are instances when it is desirable to include an embossed ridge along only one edge, especially when only two mat assemblies are expected to be linked together.

Secured to mat area 14 is at least one mat 12 which desirably is a stack or pad of mats as seen in FIGS. 1, 2 and 3. The pad of mats 12 is generally large enough to accommodate two average size shoes of persons who walk across the mat before entering a clean area. Additionally, to make use of the beveled surfaces 15 of the support the pad of mats 12 extends proximate to the beveled surfaces. In this way, a wheel rolling up the inclined plane of beveled surface 15 can roll directly onto the mat with minimal impact or shock to the rolling equipment.

When using a pad of mats 12 in conjunction with this invention, the bottom most mat in the pad is secured to the mat area by any convenient means such as tape, adhesive, and the like. The upper surface of each mat 12 has an adhesive layer 20 thereon. This adhesive layer 20 is sufficient to retain loose particles of dirt, dust and the like coming in contact therewith, especially under the pressure of a foot or wheel passing over the mat. Adhesive materials to perform this function are well known and may be selected according to choice, practicability and performance. In the pad of mats 12 the under or lower surface of each mat preferably has no adhesive material thereon. Alternatively, however, the lower surface of each mat may have a layer of adhesive material thereon but deposited in such a manner as to provide less adhesive strength than the adhesive layer on the upper surface of that mat. The lower surface of each mat is treated as such so that each mat 12 may be readily peelable in succession and in descending order from its adjacently attached mat. In this way when the adhesive layer on the mat being used becomes diminished and its effectiveness reduced, the mat is merely peeled away to expose the next fresh sheet directly underneath. This peeling of mats continues until the last mat is used up, then the last mat and support, being disposable, are discarded. For ease of peeling a non-adhesive tab 21 may be placed on the corner of each mat to facilitate the peeling step.

In order for the combination of support and mat to be disposable the materials used are generally inexpensive, accessible and easily fabricated to the desired configuration. Plastic materials for the support are very practicable with the preferred material being styrene. Other plastic materials such as polyethylene or polyvinylchloride may also desirably be used. When such plastic materials are selected to form the support the beveled surfaces, the reinforcing indentations and interlocking ridges may readily be molded into the support in a one-piece construction. Molding the support to the desired configuration is accomplished since the plastic material is generally thin, in the order of 0.010 to 0.050 inches (0.0254 to 0.127 cm.). This thin material is very flexible thereby providing advantages in handling and adapting the mat assembly to uneven floor situations. The support material in the preferred embodiment as illustrated in the drawings is 0.025 inches (0.0635 cm.) thick.

Generally, the dimensions of the combination support and mat assembly are dictated by the space intended to be covered before entrance to a clean area, by any fabrication limitations and by economics. While the size of the mat and the support may vary widely, the typical dimensions of the combination mat and support shown in FIG. 1 are 48 inches (122 cm.) long by 19 inches (48 cm.) wide. These dimensions are for the support material, while the size of the mat itself is somewhat smaller to account for the beveled surfaces along the end edges and the embossed ridges on the side edges of the support.

While not necessary in all applications, it is often desirable to place tape, adhesive or other frictional medium on the underside of the support so that slippage of the mat assembly will not occur during use on the floor. Tape or adhesive also helps keep the frames together when interlocking more than one unit together.

In another embodiment of the present invention the support is designed to allow wheels of rolling equipment to roll onto the mat assembly from either the short end edge or from the long side edge. This embodiment is shown in FIG. 7 wherein the support 22 is generally flat across its entire width. Along each long, side edge is a member 24 which is inclined upwardly toward the interior of the support 22. Each inclined member 24 is preferably extruded to its proper shape and is secured to the side edge of the support in order to act as a ramp for wheels of rolling equipment passing onto the mat assembly from the longside thereof. The inclined member 24 reduces the shock and impact when the wheels pass onto the mat. Inclined member 24 may be extruded from many different materials depending upon many factors, but preferably is polyvinylchloride. This embodiment with the extruded inclinded members is used primarily in conjunction with the support having reinforced bevels on the end edges thereof.

Thus, it is apparent that there has been provided in accordance with the invention a disposable support and mat combination that fully satisfies the aims, advantages and aspects as set forth above. While the invention has been described in conjunction with specific embodiments thereof, it is evident that many alternatives, modifications and variations will be apparent to those skilled in the art in view of the foregoing description. Accordingly, the plenary invention is intended to embrace all such alternatives, modifications and variations as fall within the broadest scope and spirit of the described invention.

What is claimed is:

1. A disposable combination of support and mat for removing loose dirt from objects coming in touch with said mat comprising: a generally flat one piece flexible support having an upper surface with an area defined thereon to accommodate a mat, said upper surface having a pair of beveled surfaces integrally formed thereon, each beveled surface being astride opposed borders of said mat area and being inclined upwards towards said mat area, said support having means along at least one edge thereof for interlocking with means of a separate but similar combination of support and mat to provide a flat, linked mat assembly; and a mat secured to said mat area and extending proximate to said beveled surfaces, said mat having an upper surface with an adhesive layer thereon sufficient to retain loose particles of dirt coming in contact therewith.

2. A disposable combination as defined in claim 1 wherein said mat is a pad of mats, each mat thereof having an adhesively treated upper surface and a lower surface with less adhesive strength than said upper surface thereof so that each mat is successively peelable from its adjacently attached mat, the bottom most mat in said pad being secured to said mat area.

3. A disposable combination as defined in claim 1 wherein said means for interlocking said support with other combinations is an embossed ridge upstanding from said upper surface of said support along an edge thereof thereby providing a relieved or depressed groove in the bottom surface of said support corresponding with said ridge, whereby other similar combinations of support and mat are linkable therewith by mating embossed ridges of one support with relieved grooves of the adjacent support.

4. A disposable combination as defined in claim 3 wherein an embossed ridge extends along two edges of said support, one ridge on each side of said mat area.

5. A disposable combination as defined in claim 1 wherein said one-piece support is a plastic material.

6. A disposable combination as defined in claim 1 wherein said beveled surfaces are reinforced.

7. A plurality of combinations of support and mat as defined in claim 1 which are linked together along an edge thereof.

8. A disposable support for carrying a mat or pad of mats for removing loose dirt from objects coming in contact with said mat comprising: a generally flat one-piece sheet of flexible material having an upper surface with an area defined thereon to accommodate a mat, said upper surface having a pair of reinforced beveled surfaces integrally formed thereon, each reinforced beveled surface being astride opposed borders of said mat area and being inclined upwards towards said mat area whereby when used with a mat said reinforced beveled surfaces stiffen those sections of the support against the impact of equipment rolling over said mat.

9. A disposable support as defined in claim 8 wherein said one-piece flat sheet of material is plastic having a thickness between 0.010 and 0.050 inches.

10. A disposable support as defined in claim 9 wherein said reinforcement of said beveled surfaces is provided by a plurality of indentations therein.

11. A disposable support for carrying a mat or pad of mats for removing loose dirt from objects coming in contact with said mat comprising: a generally flat one-piece sheet of flexible material having an upper surface with an area defined thereon to accommodate a mat, said upper surface having a pair of beveled surfaces integrally formed thereon, each beveled surface being astride opposed borders of said mat area and being inclined upwards towards said mat area, said support having means along at least one edge thereof for interlocking with means of a separate but similar combination of support and mat to provide a flat, linked mat assembly.

12. A disposable support as defined in claim 11 wherein said means for interlocking said support with other combinations is an embossed ridge upstanding from said upper surface of said support along an edge thereof thereby providing a relieved or depressed groove in the bottom surface of said support corresponding with said ridge, whereby other similar combinations of support and mat are linkable therewith by mating embossed ridges of one support with relieved grooves of the adjacent support.

13. A disposable support as defined in claim 11 wherein said flat one-piece sheet of material is plastic.

* * * * *